March 28, 1939. W. I. SENGER 2,151,808
MACHINE TOOL TRANSMISSION AND CONTROL
Filed Dec. 23, 1936 9 Sheets-Sheet 9

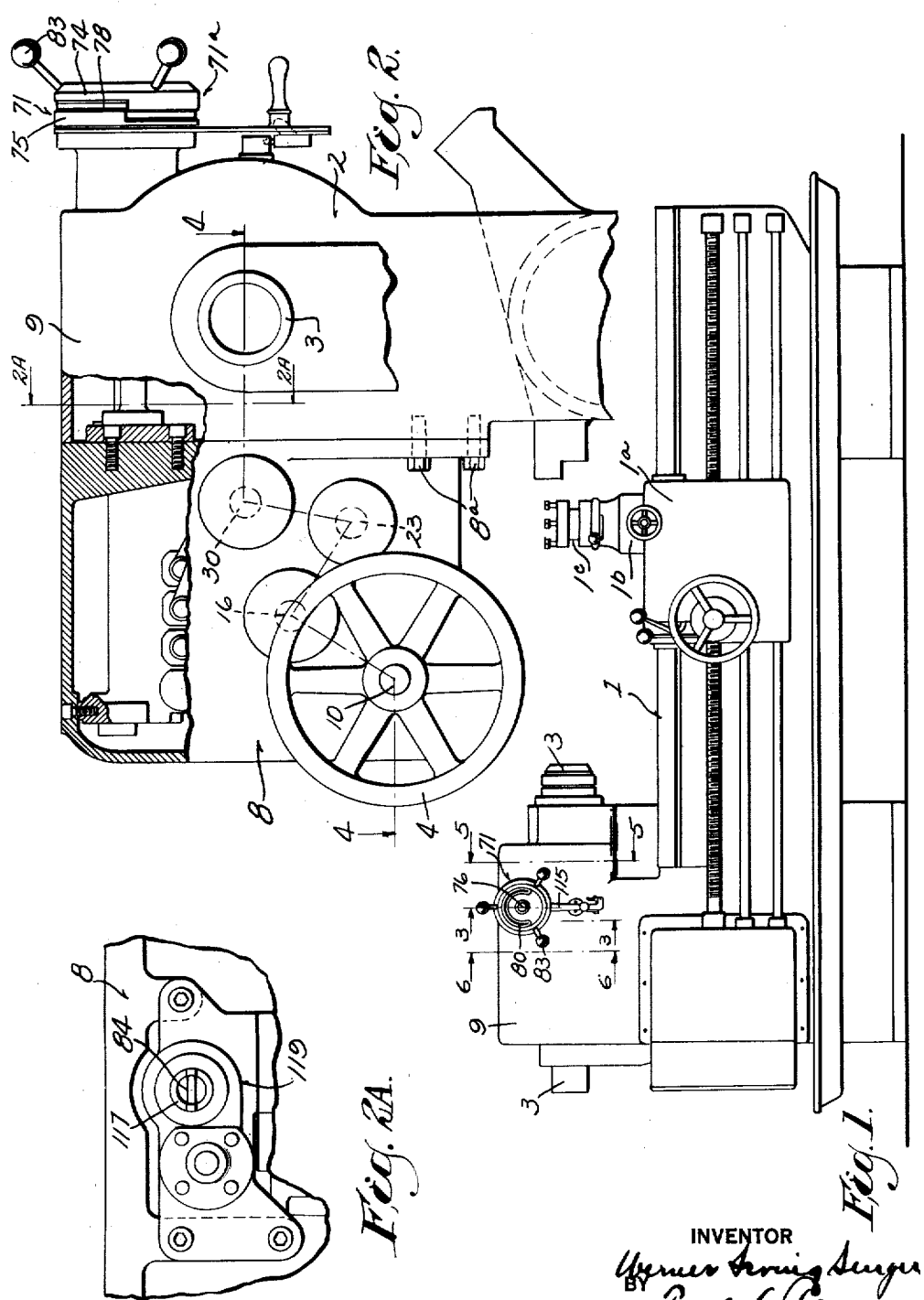

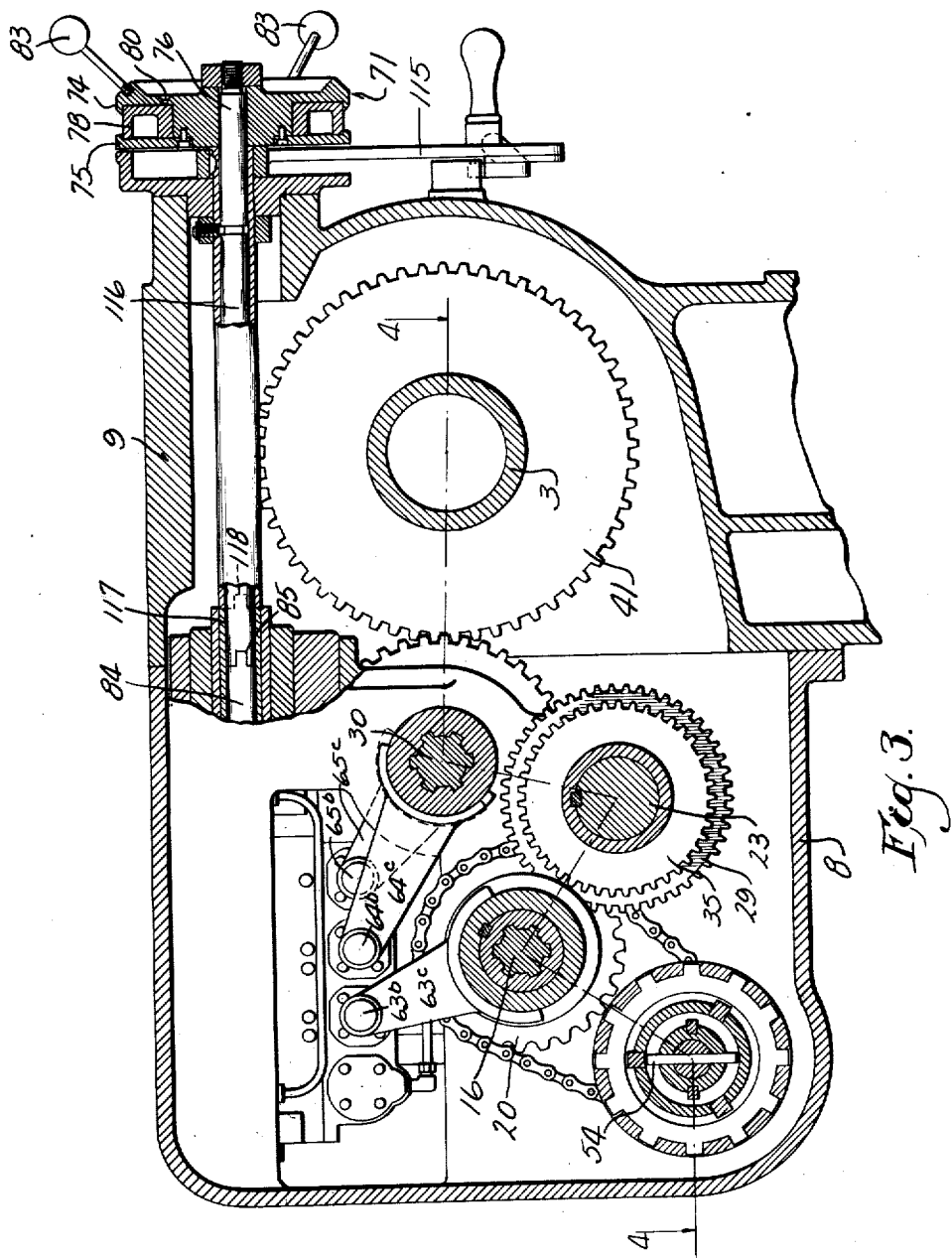

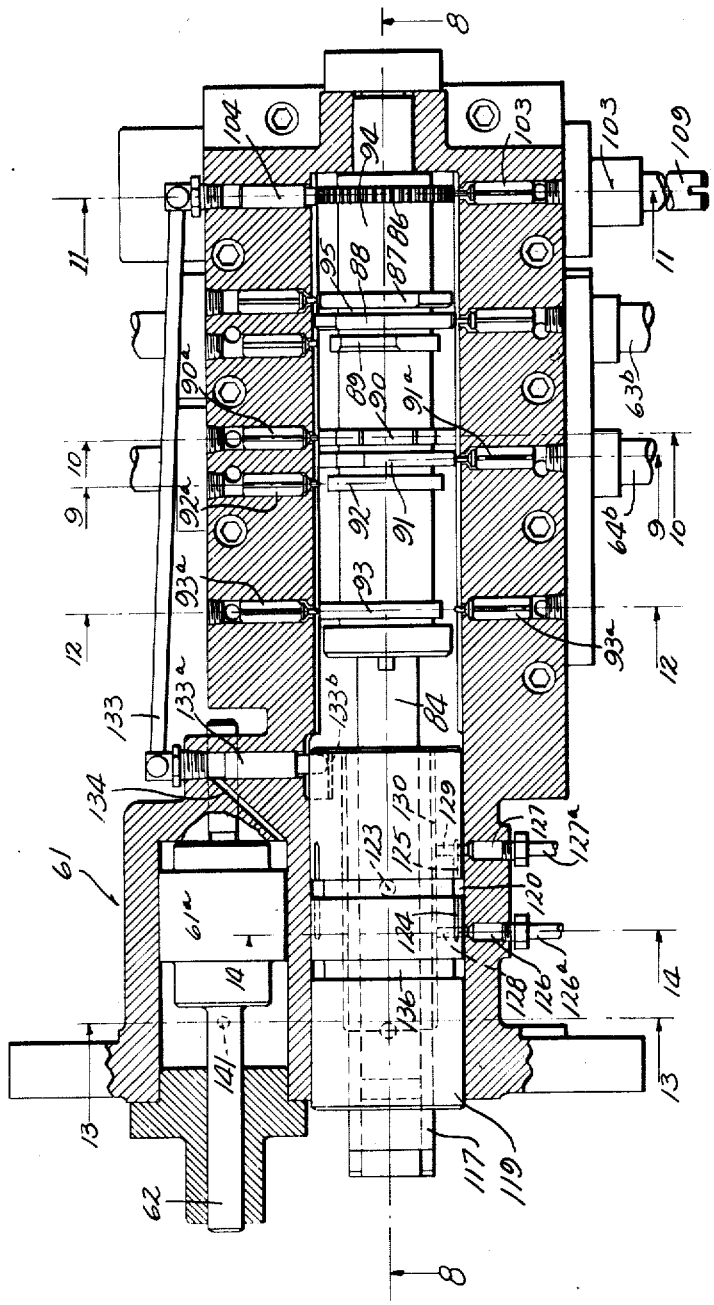

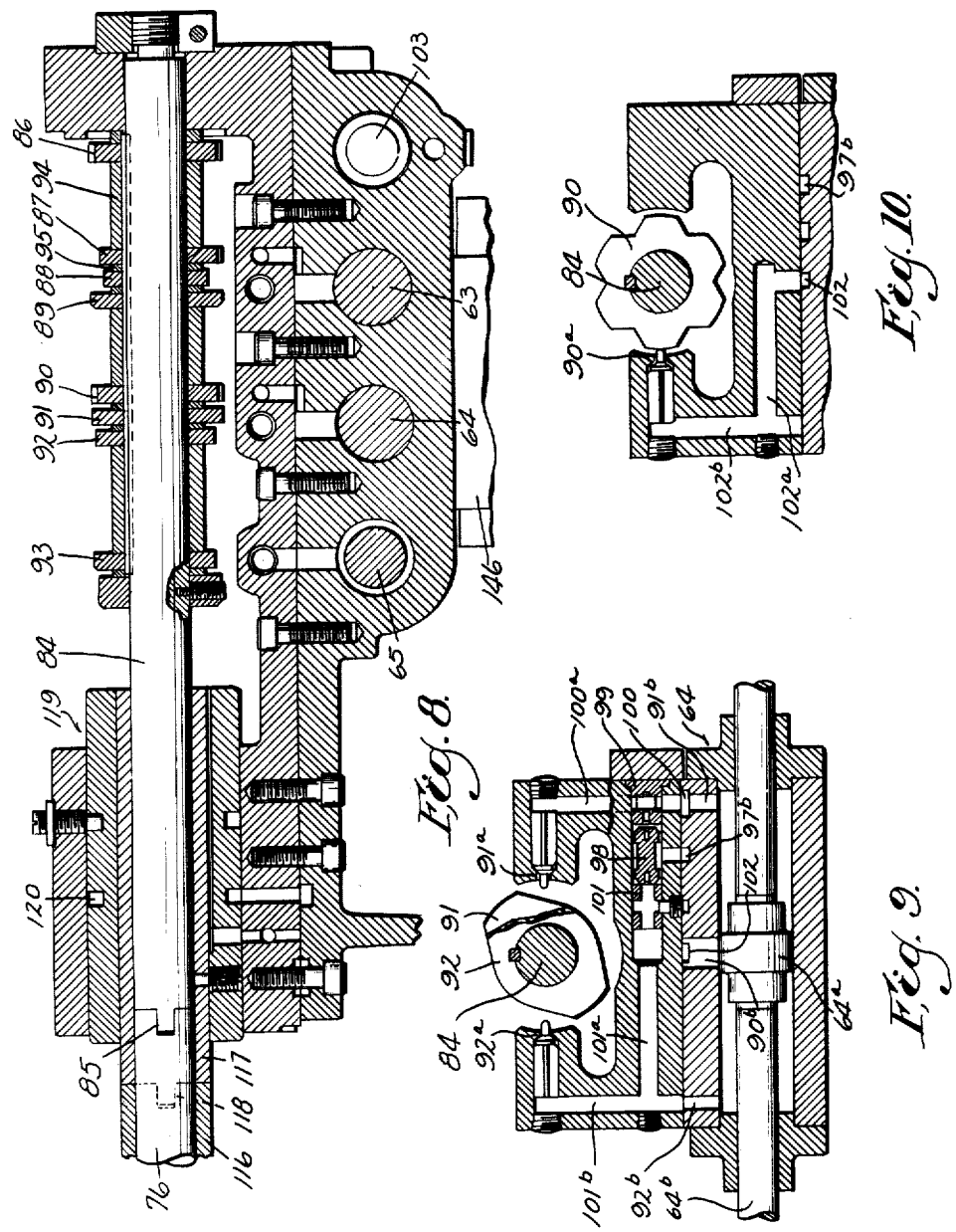

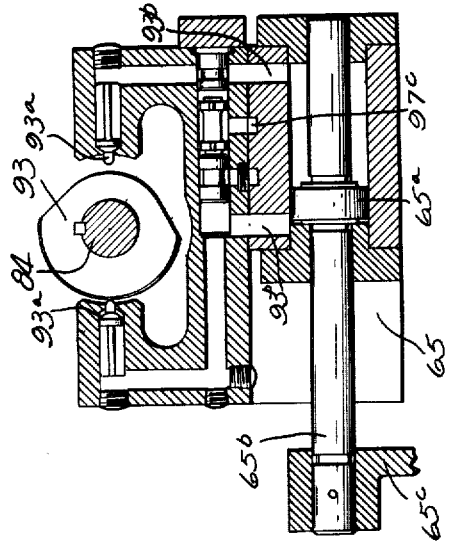
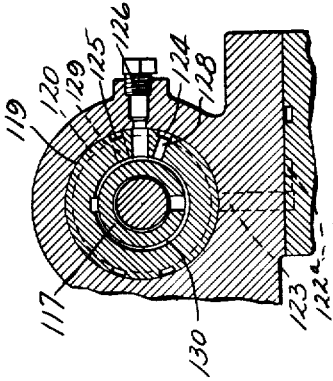
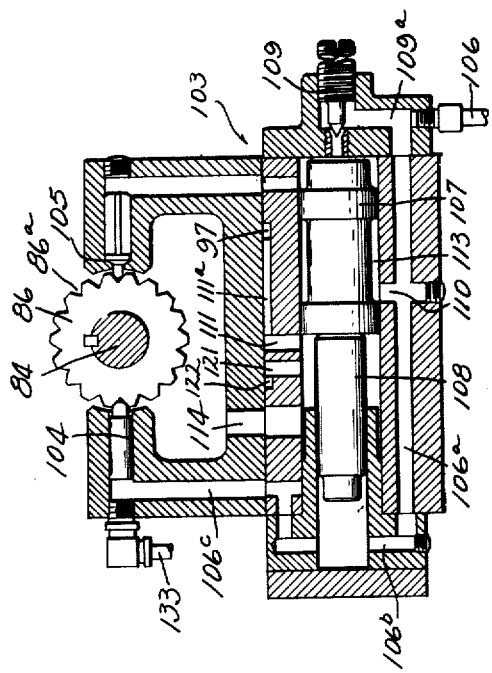
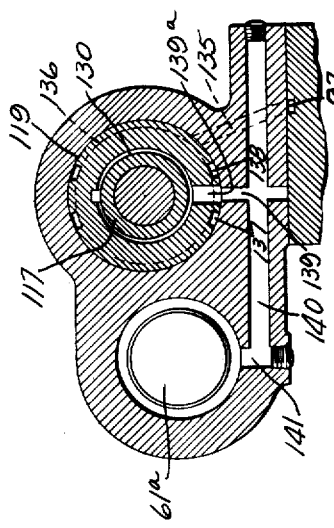

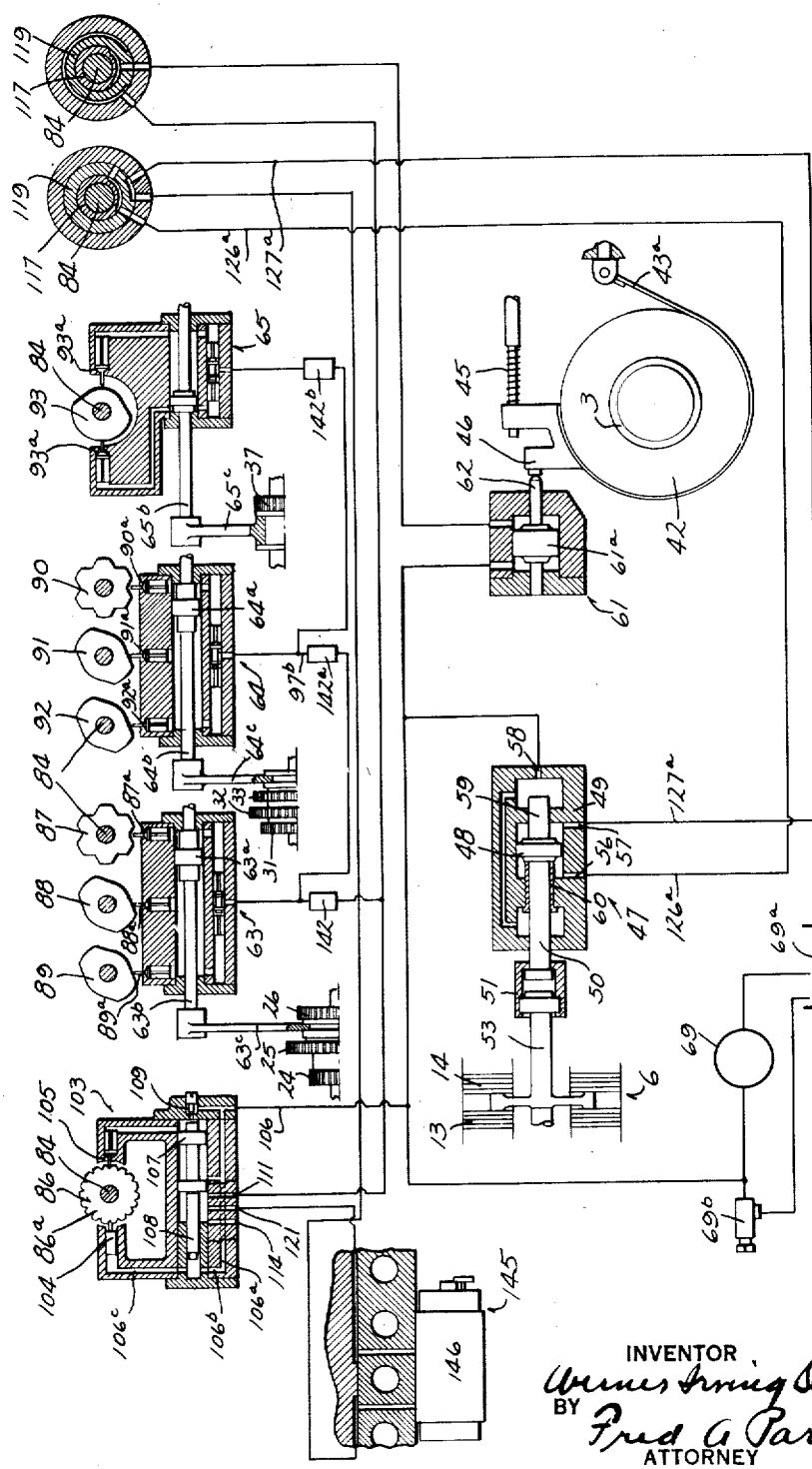

INVENTOR
Werner Irving Senger
BY Fred G. Parsons
ATTORNEY

Patented Mar. 28, 1939

2,151,808

UNITED STATES PATENT OFFICE 2,151,808

MACHINE TOOL TRANSMISSION AND CONTROL

Werner Irving Senger, Madison, Wis., assignor to Gisholt Machine Company, Madison, Wis., a corporation of Wisconsin Application December 23, 1936, Serial No. 117,305

15 Claims. (Cl. 82—29)

This invention relates to machine tools and more particularly to lathes.

In certain machine tools, and particularly in lathes, in order to insure and maintain accurate alignment of a main spindle relative to the path of travel of carriages or supports it is desirable that the spindle be journaled in the same integral casting or frame which carries the slides for the movable support, but for various reasons, and particularly for manufacturing economy and to effect interchangeability of the speed change and control units between various machine sizes, it is desirable that the speed change and speed shifter mechanism for the spindle be carried in a unitarily removable casing or housing.

A purpose of the invention is to provide a machine tool having an improved spindle supporting structure integrally formed with guide or supporting structure for a bodily movable support and particularly for lathes.

A further purpose is to provide an improved speed change transmission and control mechanism for the spindle, which is unitarily removable and interchangeable, particularly for lathes.

A further purpose is to provide unitarily removable transmission and control mechanism for spindles mounted in an integral portion of the supporting structure of a bodily movable support, in a form such that the line of separation of the supporting structure and the transmission and control unit is in an improved position and relationship for maximum effective rigidity of the resulting machine structure when the unit is in place, and particularly for lathes.

A further purpose is to provide a lathe having a spindle supporting headstock journaling the spindle and rigidly and integrally formed with the carriage supporting bed, while substantially all of the speed change transmission and control mechanism for the lathe spindle is carried unitarily in a removable, replaceable and interchangeable casing or housing and the transmission and control devices unitarily carried by the casing are of such form and structure as to be automatically disconnected and reconnected with elements carried by the headstock or bed during removal and replacement of the unit.

A further purpose is to provide an improved transmission and control mechanism for machine tools in which both the transmission and control are divided into portions carried by separate units, the units respectively carrying certain preferred portions and adapted to be attached to one another in a preferred manner for simultaneously effecting the coupling together of the different portions both of the transmission and control mechanism, particularly for the spindle transmission of lathes.

A further purpose is to effect one or more of the purposes previously mentioned where the transmission and control mechanism is of the improved form and effect described in one or more of certain interrelated co-pending applications, namely, Serial No. 24,201, filed May 31, 1935, Serial No. 58,549, filed January 10, 1936 and Serial No. 83,306, filed June 3, 1936.

A further purpose is generally to simplify and improve the construction, operation and relationship of transmission and control mechanism of a machine tool, and the relationship of the transmission and control mechanism to the structure of the machine tool, and particularly for lathes.

The invention consists in the construction and arrangement of parts as herein illustrated, described and claimed, and in such modifications thereof as are equivalent to the structure claimed.

Throughout the specification the same reference characters have been used to indicate the same parts, and in the drawings:

Figure 1 shows a semi-diagrammatic front view of a lathe in which the invention is incorporated.

Figure 2 is an enlarged left end elevation of the upper portion of the same structure.

Figure 2A is a partial front view of a rear unit, viewed from the line 2A—2A, Fig. 2.

Figure 3 is a partial vertical section taken approximately along the line 3—3 of Fig. 1 and enlarged.

Figure 7 is an enlarged horizontal section of a controller device carried by the unit shown in Fig. 5, and taken approximately along line 7—7 of Fig. 5.

Figure 8 is a vertical section of the same controller unit and certain associated structure taken approximately along line 8—8 of Fig. 7.

Figures 9, 10, 11, 12, 13 and 14 are vertical sections of the same controller unit taken respectively along lines 9—9, 10—10, 11—11, 12—12, 13—13, 14—14 of Fig. 7.

Figure 15 is a more or less diagrammatic view of the transmission and control mechanism of the machine and certain interconnections thereof.

Figure 4:
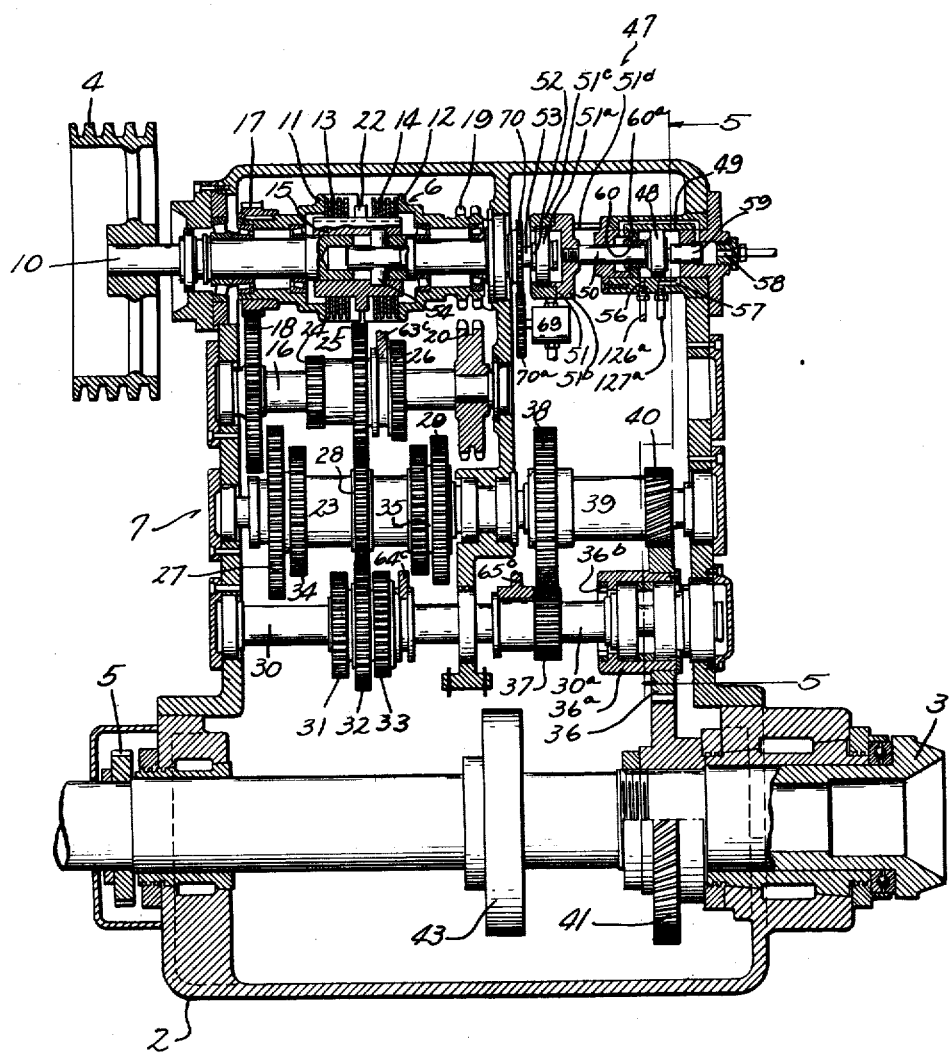
Figure 4 is a sectional development of the spindle transmission taken approximately along the line 4—4 of Fig. 2, and also of Fig. 3.

The machine of the drawings is a lathe, which includes a bed 1, Fig. 1, having integrally formed therewith an upstanding headstock portion 2. A spindle 3, Figs. 1, 4, is driven from a drive pulley 4. A carriage 1a, Fig. 1, carries a cross slide 1b and a tool turret 1c, the carriage being driven through a feed train which may be any of several well known types driven from the spindle 3 through a feed gear such as 5, Fig. 4. Spindle transmission mechanism is provided for driving spindle 3 from pulley 4 at a variety of rotational speeds. The spindle transmission includes the pulley 4, a reverser-interruptor generally denoted by the numeral 6, Fig. 4, and a rate change device generally denoted by the numeral 7, the pulley, reverser, rate changer and certain of the other mechanism later described being unitarily carried by a removable housing or casing 8, Figs. 2, 4, forming a portion of the headstock which is rigidly removably fixed with the upstanding portion 2 integrally formed with the bed and, in which spindle 3 is rotatably mounted, the housing 8 being fixed with portion 2 by the means of screws such as 8a, 8a, and suitable dowels (not shown).

The reverser-interruptor 6 is unitarily carried by the removable casing 8 and is of the following construction: Pulley 4, Fig. 4, is fixed on a shaft 10 and carries a plurality of outer clutch members 11, 12 each independently rotatable and respectively keyed with the alternate driven plates of different friction plate groups 13, 14 of different driving clutches each having alternate driving plates keyed to an inner member 15 which is slidably keyed on shaft 10. The member 11 drives a shaft 16 through meshed gears 17, 18. Member 12 drives shaft 16 through double sprockets 19, 20, the sprockets being connected by drive chains such as 21, Fig. 3. The inner member 15 provides an annular abutment portion 22, and is axially shiftable to alternatively cause frictional engagement between the plates of group 13, or oppositely to cause engagement of the plates of group 14, and the arrangement is such that as member 15 is shifted in opposite directions the shaft 16 is driven in forward and reverse directions.

The spindle rate changer 7 is unitarily carried by the removable housing member 8 and is constructed as follows: A shaft 23, Fig. 4, is driven from shaft 16 through a rate change device which includes the gears 24, 25, 26 fixed together and slidably keyed on shaft 16 and respectively engageable one at a time with gears 27, 28, 29 which are fixed on shaft 23. A shaft 30 is driven from shaft 23 through a rate change device which includes the gears 31, 32, 33 fixed together and slidably keyed on shaft 30 and respectively engageable one at a time with a gear 34, the gear 28 and another gear 35, each of the gears 34 and 35 being also fixed on shaft 23. A gear 36 is fixed on a sleeve 36a which is rotatably supported on the extended end 30a of shaft 30, sleeve 36a and gear 36 being driven from shaft 30 through a rate change device which includes a clutch gear 37 shiftable to engage internal clutch elements 36b on sleeve 36a, in which case gear 36 is driven at the same speed as the shaft 30, or to engage gear 38 of a reduction train consisting of gear 38, a shaft 39 co-axial with the shaft 23, and a gear 40 which meshes with gear 36, in which case gear 36 is driven at relatively slow speed. The gear 36 drives spindle 3 and feed gear 5 through a meshed gear 41 fixed on the spindle, and the several rate change devices and the reverser provide for eighteen changes of rotational spindle speed, substantially in a geometrical progression, and in either direction.

Figure 6:
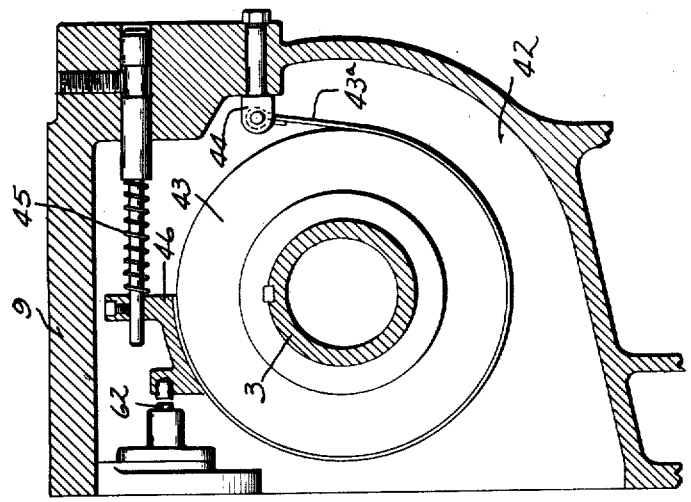
Figure 6 is an enlarged vertical section through the headstock portion shown at the right in Fig. 3 taken approximately along the line 6—6 of Fig. 1.

A spindle brake device generally denoted by the numeral 42, Fig. 6, is carried by the upstanding portion 2, and includes a brake drum or friction wheel 43, Figs. 4, 6, fixed on spindle 3, a friction band 43a anchored at the one end with a stud 44 and normally urged toward released position by a spring 45 acting on an abutment member 46 which is fixed to the band.

The reverser 6, the various rate change devices, and brake 42 are provided with means for their power operation, substantially wholly carried by the removable housing member 8 and including fluid operable piston devices as follows:

A reverser piston device for reverser 6, generally denoted by the numeral 47, Figs. 4, 15, is unitarily carried by housing 8 and includes a fluid operable piston 48, a cylinder 49, and a piston rod 50 provided with a coupling unit 51 which engages the enlarged end 52 of a shifter rod 53 slidable in an axial bore of the shaft 10, rod 53 being extended to carry a shifter member 54, Fig. 4, which extends radially outwardly through suitable slots in the shaft 10 to engage at its ends with the slidably keyed reverser clutch member 15, whereby, as piston 48 is shifted, the abutment portion 22 of the member 15 is correspondingly shifted to operate the reverser 6. The coupling unit 51 may be of any suitable form to transmit axial movement between piston rod 50 and shifter rod 53, while permitting relative rotation thereof, but in the present instance includes an anti-friction thrust bearing 51a and suitable thrust plates 51b, 51c fixed on piston 50 and engaging the outer race, there being suitable means, as rod 51d preventing rotation of the thrust plates.

The piston 48 of reverser piston device 47 may be alternatively operated in the one or the other direction, whereby to engage the reverser 6 for forward or reverse rotation, by fluid pressure from suitable ports 56, 57, Fig. 4. Fluid pressure is continuously supplied to piston device 47 from a port 58 which continuously tends to shift reverser 6 to its central or non-engaged position, the pressure from port 58 acting at the one end of the device against an extended portion 59 of piston rod 50, and at the other end of the device against a shouldered sleeve 60. Whenever fluid pressure is applied through either port 56, 57 the piston 48 and rod 10 are shifted against the resistance of the fluid pressure from port 58 by reason of the relatively large area of piston 48, but when pressure is released from both ports 56, 57 the piston device 47 and reverser 6 will immediately be shifted to central non-driving position, the fluid from port 58 then simultaneously forcing the sleeve 60 to the right against a shouldered portion 60a, and forcing the piston rod to the left until the piston rests against the end of sleeve 60.

A spindle brake piston device, generally denoted by the numeral 61, Figs. 7, 15, is unitarily carried by removable housing members 8 and includes a piston 61a, having a rod 62, Figs. 6, 7. Piston 61a may be forced to the left in Fig. 7, as will be later explained, to overcome spring 45 and engage brake 42, or may be forced in the other direction to permit spring 45 to release the brake.

For the speed change device comprising the shiftable gears 24, 25, 26, Figs. 4, 15, there is provided a shifter unitarily carried by housing member 8 and including a piston device generally denoted by the numeral 63, Figs. 8, 15, which includes a piston 63a, upon the piston rod 63b of which is fixed a shifter arm 63c engaging a suitable annular groove in the gear unit.

For the speed change device comprising the shiftable gears 31, 32, 33, Figs. 4, 15, there is provided a shifter unitarily carried by housing member 8 and including a piston device generally denoted by the numeral 64, Figs. 8, 9, 15, which includes a piston 64a, upon the piston rod 64b of which is fixed a shifter arm 64c engaging a suitable annular groove in the gear unit.

For the speed change device comprising the shiftable clutch gear 37, Figs. 4, 15, there is provided a shifter unitarily carried by housing member 8 and including a piston device generally denoted by the numeral 65, Figs. 8, 12, 15, which includes a piston 65a upon the piston rod 65b of which is fixed shifter arm 65c engaging a suitable annular groove in the hub of the gear.

Figure 5:
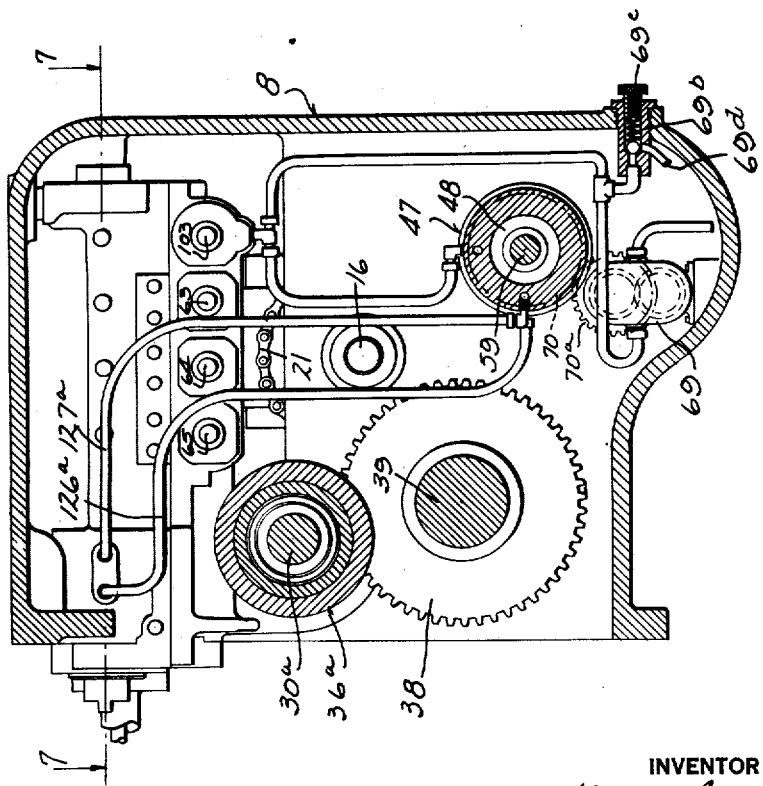
Figure 5 is a vertical section through a unit shown at the left in Fig. 3, taken approximately along line 5—5 of Fig. 1 and more exactly along line 5—5 of Fig. 4.

For the operation of the several piston devices a pressure fluid source, such as a pump of any suitable type, as indicated at 69, Figs. 5, 15, is carried by removable housing member 8 and is driven whenever pulley 4 is running, as for instance by a gear 70, Figs. 4, 5, fixed on shaft 10 and engaging a gear 70a on the pump shaft, the pump drawing oil from a sump 69a, Figs. 5, 15, formed by the lower portion of the removable housing 8. Excess oil and waste from operation of the shifters is used to lubricate the transmission. The pressure of the fluid for the several piston devices is maintained constant by providing pump 69 with excess capacity, and by providing a pressure relief valve 69b, Figs. 5, 15, of suitable type and having a member 69c exposed for adjustment of the pump delivery pressure. Excess fluid from valve 69b may be distributed through lubricating channels (not shown) fed by a pipe 69d, Fig. 5, and returned to the sump.

Figure 16:
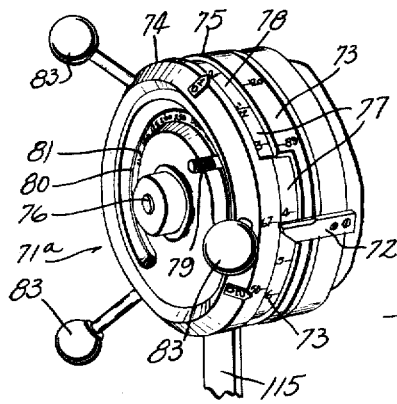
Figure 16 is a perspective view of the speed change controller chart or indicator device shown at the front of the headstock in Fig. 1.

Control means for the operation of the various piston devices is provided as follows:

A speed selector device, generally indicated by the numeral 71, Figs. 3, 16 is similar to that shown in said co-pending application, Serial No. 58,549, which will therefore here be only briefly described. The selector device includes a manually operable control portion 71a, Figs. 2, 16, carried by the integral bed portion 2, which provides a fixed indicator pointer 72 against which a plurality of charts or scales are readable. One of the charts includes numerals such as 73 arranged on the exposed peripheries of flange members 74, 75 which are both fixed for rotation with a shaft 76. The numerals 73 are arranged in consecutive order and correspond with the rotative speeds available for spindle 3 upon operation of the several rate change devices to their various position combinations. Another chart readable against indicator 72 includes numerals such as 77 arranged on the periphery of an annular member 78 which is frictionally held to be normally rotatable with the flange members 74, 75, but is adjustable relative thereto by the means of a handle 79 which projects through a slot 80 in the member 75. The numerals 77 indicate different work diameters within the speed range of the machine and arranged in consecutive order. Still another chart includes numerals such as 81, arranged in consecutive order on the face of the member 78 to be visible through slot 80 and readable against an indicator pointer or arrow 82 which is rotatable with shaft 76. The numerals of the last mentioned chart are arranged to indicate surface or peripheral speed on the work piece rotating with the spindle.

As illustrative of the use of the speed selector device there is selected on the chart 81 a desired peripheral speed suitable for the turning tool used and for the work material to be operated upon, the member 78 being turned by lever 79 until that peripheral speed is indicated against a suitable pointer, not shown, fixed on flage member 74. Shaft 76 is then turned in either direction by the means of handles such as 83 until the diameter of the work piece as listed on the chart 77 is indicated against the pointer 72. If this does not exactly correspond to an available rotational speed, as indicated on chart 73 then choice must be made of a slightly higher or lower rotational speed, the rotative speed thus selected being aligned with pointer 72, whereupon the shifter devices, later described, will shift the rate change devices to effect the desired speed.

The positioning of the manually operable control portion 71a, as previously described, effects the selected speed by the means of mechanism unitarily carried by the removable housing 8 and coupled with the portion 71a, and including mechanism as follows:

Shaft 76, Fig. 3 of the control portion 71a, is coupled for rotation with a co-axial shaft 84, Figs. 7, 8 by the means of an axially disengageable tongue and slot coupling indicated at 85, Fig. 8, the shaft 84 and its associated control mechanism being unitarily carried by housing 8. Fixed on shaft 84 are a plurality of cam members 86, 87, 88, 89, 90, 91, 92, 93, Figs. 8, 15 separated by spacers such as 94, 95, to operate various poppet valves which control the shifting of the piston devices to effect rate changing.

Thus, for controlling the movement of the piston device 63 the cams 87, 88, 89, Figs. 8, 15 respectively operate the poppet valves 87a, 88a, 89a. For piston device 64 the cams 90, 91, 92 operate poppet valves 90a, 91a, 92a and for piston device 65 the cam 93 operates both the poppet valves 93a, 93a. In each instance the configuration of the cams is such that as shaft 84 is rotated one only of the poppet valves of each piston device is opened by the cams in each angular position of the shaft 84 corresponding to the points where the different rotative speed indicating chart numerals 73 read against the indicator pointer 72. In each such positions the cams are cut away to permit the fluid pressure to close the other valves of the set against their seats. It will be understood that in the drawings the cams are more or less diagrammatically shown, but it will be obvious that in each device the cams may be formed to operate as just described.

The different poppet valves of the piston devices 63, 64, 65 each communicate with a different port of the associated piston device, the ports being spaced in the direction of piston movement according to the different piston positions required. Opening the poppet valve results in movement of the piston of the device to a position corresponding to the port leading to the open valve, whereby to shift the speed change units to the indicated speed position. As illustrative of this action the operation of the piston device 64 is as follows:

Referring to Figs. 9, 10, the piston device 64 has ports 90b, 91b, 92b respectively controlled by poppet valves 90a, 91a, 92a through suitable channels. In each instance opening the poppet valve will provide a fluid drain for the port. The ports are spaced in accordance with the three positions required for the piston 64a. Fluid is supplied to the piston device through a channel groove 97b and a valve member 98 which may move axially in either direction. In the one direction of movement valve 98 seats against a member 99 to prevent flow of fluid from channel 97b to a groove 100 which communicates directly with port 91b, and with the poppet valve 91a through a channel 100a. In the other direction of movement valve 98 seats against a member 101 to prevent flow of fluid to the port 92b or to poppet valve 92a through the channels 101a, 101b. Thus if either poppet valve 91a or 92a is opened the resulting reduction of pressure moves valve 98 in the direction of the opened poppet valve, and holds it in position closing the flow of fluid from supply channel 97b to the open valve. This leaves the one end of piston 64a connected to the pressure supply, and the other connected to the open poppet valve. The piston will therefore move in the direction of the open valve, thereby shifting the associated gear unit. Port 90b communicates with poppet valve 90a through a groove 102, Figs. 9, 10, and channels 102a, 102b, and, similarly to the operation just described, the opening of poppet valve 90b when piston 64a is in either extreme position, relieves the pressure on one end of the piston, whereupon the pressure on the other end moves the piston until the piston covers the port 90b leading to the open poppet valve.

The spacing of the ports 90b, 91b, 92b is such that, accordingly as the one or the other of the poppet valves is opened the piston 64a will move to three positions, corresponding to the three speed productive positions of the gears 31, 32, 33, accordingly as the cams 90, 91, 92 open the one or the other of the poppet valves 90a, 91a, 92a.

The piston device 63 is constructed similarly to the device 64, just described and is similarly moved to three positions, corresponding to the three positions of gears 24, 25, 26, accordingly as cams 87, 88, 89 open poppet valves 87a, 88a, 89a. Since the connection and operation is substantially the same as the device 64 it will not be described in detail.

The piston device 65, Figs. 12, 15, is also similarly controlled for movement to the two positions of the clutch gear 37 by the means of fluid supplied from a channel 97c, accordingly as cam 93 opens the one or the other poppet valve 93a, 93a, but in this instance, the piston 65a having only two positions, only two ports are required, as shown at 93b, 93b, Figs. 12, 15.

The various poppet valve cams associated with piston devices 63, 64, 65 are so configurated and positioned that as shaft 84 is rotated the various piston devices and speed change elements are moved to different position combinations resulting in speeds arranged in numerical order, and at points in the rotation of the shaft corresponding to the position of the rotation chart numerals 77 as they are successively readable against indicator 72. This results also in the arrangement of the numerals of the other charts in numerical order, the spacing thereof being determined by the spacing of the numerals on the rotation chart.

Means are provided to prevent the shifters from starting to move as the selector shaft 84 is rotated to pass through one or more positions corresponding to undesired speeds. To effect this result and other results later mentioned there is provided a delay device, generally denoted by the numeral 103, Figs. 11, 15, and unitarily carried by the housing 8. The cam 86, Figs. 8, 11, 15 is provided with notches such as 86a, corresponding in number and position to the speed positions of selector shaft 84. The notches 86a are normally engaged by a fluid pressed detent plunger 104, yieldably holding the cam and shaft in the various speed positions, both to mark the speed position for the operator, and to locate the cam relative to a poppet valve 105, the plunger 104 being continuously supplied with fluid from source 69, as by a pipe channel 106, and communicating channels 106a, 106b, 106c.

The delay device 103 includes a piston plunger 107 and a piston plunger 108 of relatively smaller area. The left end, Fig. 11, of piston 108 is continuously supplied with fluid through the channels 106, 106a. The right end of piston 107, Fig. 11, is supplied with fluid from channel 106 through an adjustable needle valve device 109 and a channel 109a. The pressure acting on the right hand end of piston 107 normally forces both pistons 107 and 108 to the left in Fig. 11, to a position where a port 110, which is continuously supplied from channel 106a, communicates with an outlet port 111, through an annular groove 113 in piston 107. The port 111 is connected to a channel 97 through a groove 111a to supply fluid to the shifter devices 63, 64, 65 as later described, but when the poppet valve 105 is opened by cam 86 during rotation of selector shaft 84 to effect a change in speed, the fluid pressure on piston 107 is immediately relieved and piston 108 forces piston 107 to the right, to the position shown in Fig. 11, and in this position the supply port 110 is cut off from port 111, and port 111 and channel 97 are connected to a drain channel 114. Piston 107 will almost immediately again move to the left to close the drain and again supply fluid to port 111 and channel 97, but only after needle valve 109 has permitted sufficient fluid to move the piston to flow therethrough. The interval of delay may be varied by adjustment of the needle valve 109, but is sufficient that in rotating shaft 84 at normal adjustment speed no pressure will be available in channel 97 for operation of the piston devices 63, 64, 65 until the selector shaft comes to rest in a desired speed position.

The reverser piston device 47, Figs. 4, 5, 15 may be controlled to shift reverser 6 into the one or the other direction position by the means of a hand lever 115, Figs. 3, 16, fixed on a sleeve 116, Figs. 3, 8, which is co-axial with shafts 76, 84, the hand lever and sleeve being carried by the integral bed portion 2, and coupled with reverser operating mechanism carried by the housing 8 and including mechanism as follows: A sleeve 117, Fig. 8, is co-axial with sleeve 116 and coupled therewith by the means of a tongue and slot coupling connection 118. Fixed on sleeve 117 is a rotary valve member 119, Figs. 7, 8 having an annular fluid channel 120, Figs. 8, 14, which is supplied with fluid from the delay device 103, Fig. 11, through an outlet port 121, a channel groove 122, Fig. 11, a channel groove 122a, Fig. 14, and channel 123, Figs. 7, 14. From the annular groove 120 short channel grooves 124, 125, Figs. 7, 14 extend respectively in opposite axial directions to effect communication between the groove 120 and the different ports 126, 127, Fig. 7, respectively as the lever 115 is moved in opposite directions. The ports 126, 127 respectively communicate through pipe channels 126a, 127a, Figs. 5, 7 with the ports 57, 56, Fig. 4, of reverser piston device 47. Simultaneously with movement of lever 115 to bring either port 126, 127, Fig. 7, into communication with the supply channel, the other port is connected to a drain, there being drilled holes 128, 129, Figs. 7, 14, suitably spaced for the purpose and communicating with an interior chamber or annular groove 130 which is extended to the end of the sleeve valve 119 to drain into the interior of the headstock. When hand lever 115 is in central position both the ports 126, 127 are connected to the drain groove 130, there being a plurality of drilled channels such as the channel 132, Fig. 14, for port 126, suitably positioned in the valve sleeve 119 to effect such connection, a similar channel being provided for the port 127.

By reason of the construction of the sleeve valve 119 and the construction of the reverser piston device 47, previously described, it will be apparent that the movement of lever 115 in either direction effects corresponding engagement of the reverser 6, while a central position of the lever 115 effects an intermediate disengaged position of the reverser.

Means are provided to control the reverser 6 from the speed selector device, and which are effective to shift the reverser to a position interrupting the transmission to spindle 3 each time a speed change is effected, and to return the reverser to its previous position, as determined by lever 115, upon completion of the speed change. As previously stated the supply of fluid to effect movement of the reverser is through the port 121, Fig. 11, of delay device 103. Port 121 normally receives fluid from supply port 110, but in the operation of the device during speed change as previously described in port 121, as well as port 111, is cut off from supply port 110 and connected to the drain port 114. The result is to connect either active port 56 or 57 of reverser piston device 47, Fig. 4 to the drain, and since the port 58 of the reverser piston device is continuously supplied with fluid, the reverser 6 will be immediately shifted to disengaged position, as previously described, where it will remain until the needle valve 109 has permitted sufficient fluid to pass to again shift piston 107, Fig. 11, to normal position connecting ports 110 and 114. Following this the reverser piston device will again be supplied with pressure fluid to shift reverser 6 to whatever position it previously occupied, unless the connection controlled by lever 115 has been changed during the speed change operation.

The brake 42, Figs. 6, 15, is controlled to be operative from the speed selector device during speed change and to be forced to braking position whenever lever 115 is in the position disengaging reverser clutch 6, as follows: Fluid pressure is continuously supplied to the brake piston 61a, Fig. 7, in a direction to urge the brake to braking position, the fluid supply being derived from pump 69 through port 106, Fig. 11, through the channels 106a, 106b, 106c, pipe connection 133, Figs. 7, 11, and a drilled channel 134, Fig. 7. The braking pressure thus applied may be overcome, whereby to release the brake, by the combined pressure of spring 45, Figs. 6, 15, and fluid pressure applied to the other side of piston 61a, at the left end, Fig. 7. Fluid for the latter purpose is supplied from port 111 of the delay device 103, Fig. 11, through the channel 97, Figs. 11, 13, a channel 135, an annular channel 136 in valve sleeve 119, Figs. 7, 13, and the one or the other of the channel grooves 137, 138, respectively positioned in the valve sleeve 119 for communication with a channel 139 in the different clutch engaged positions of lever 115 and sleeve 119. From channel 139 the pressure fluid reaches piston 61a through channels 140, 141. In the disengaged or central position of reverser control lever 115 the valve sleeve 119 is in position, as shown in Fig. 13, to close the channel 139 against both the supply channels 137, 138, and to open the channel 139 to the drain 130 through a channel 139a in valve sleeve 119 whereby to cause engagement of the brake.

Thus, whenever the reverser 6 is engaged in either direction position the brake 42 is normally disengaged, but upon shifting of the reverser to disengaged position brake 42 engages. Also, since the supply of brake disengaging fluid is through the port 11 of delay device 103 it will result that in each operation of speed changing the brake release supply will be connected to drain port 114, Fig. 11, and the brake will then be engaged temporarily irrespective of the position of the reverser control devices, substantially simultaneously with disengagement of the reverser is previously described. But, as later explained, the brake is disengaged again before the reverser is re-engaged. A fluid operated detent member 133a, Fig. 7, is continuously pressed by fluid from the pipe channel 133 to engage suitable notches such as 133b in the sleeve valve 119, whereby to define the three positions of the sleeve valve.

By reason of the relative positions of the port 111, Fig. 11, which supplies pressure fluid to the shifter devices 63, 64, 65 and also for releasing brake 42, and port 121, which supplies fluid to engage reverser 6, the port 121 is opened to the drain 114, during right hand movement of piston 107, before the port 111. Therefore, during any speed change operation the reverser 6 is disengaged somewhat before the brake 42 is engaged.

Figure 17:
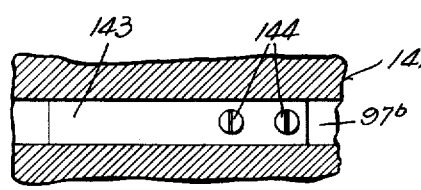
Figures 17 and 18 are partial sections showing respectively top and side views of a pressure delay device associated with certain rate change piston devices.
Figure 18:
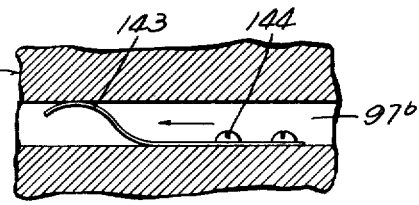

Following connection of port 111, Fig. 11, to the drain 114 during the right hand shifting of piston 107 the brake 42 is immediately engaged, thereby stopping rotation of spindle 3. Following operation of needle valve 109 to again connect port 111 to the supply port 110 the brake 42 is released immediately and before the operation of any of the piston devices 63, 64, 65, there being restricting means operative on each of the piston devices but not on brake releasing means, as follows: Referring to Fig. 15 it will be seen that the fluid pressure from port 111 of the delay device 103 reaches the shifter piston devices 63, 64, 65 only through devices 142, 142a, 142b. These devices are serially arranged for the piston device 63 to receive fluid only through device 142, while piston device 64 receives fluid through both devices 142, 142a, and piston device 65 receives fluid through all three devices 142, 142a, 142b. The several devices 142, 142a, 142b are similar in construction and operation and therefore only the device 142a is shown in detail. Referring to Figs. 17, 18 the device includes a spring member 143 which is fixed by means of screws such as 144 in the channel or supply groove 97b through which fluid reaches the piston devices 64 and 65, the edges of the spring being closely but movably fitted to the sides of the channel groove, and the spring being of such form as to close the channel except as it is sprung by the pressure of the fluid. The springs of each device 142, 142a, 142b are of material resistance, as for instance 15 or 20 pounds. As will be seen from Fig. 15, the devices 63, 64, 65 will therefore operate in sequence as the pressure from delay device 103 rises; the device 63 operating when the fluid overcomes the first device 142, the device 64 operating when the pressure is twice as high whereby to overcome both the device 142 and 142a, and device 65 operating only when the pressure is sufficient to overcome the three devices 142, 142a, 142b. Since brake 42 receives its pressure for brake release from port 111, Fig. 11, exclusive of devices 142, 142a, 142b, as shown in Fig. 15, the brake will be released during any rate change prior to the operation of either piston device 63, 64, 65.

The fluid for the supply of the reverser piston device 47 is derived through the channel 121 of the delay device 103, Fig. 11, as previously explained. The relative positions of ports 111 and 121 is such that, following a rate change operation, the left hand movement of piston 107 will connect port 111 to the supply port 110 prior to the connection of port 121 for re-engagement of the reverser 6. Brake 42 will, therefore be released prior to the re-engagement of reverser 6.

Figure 19:
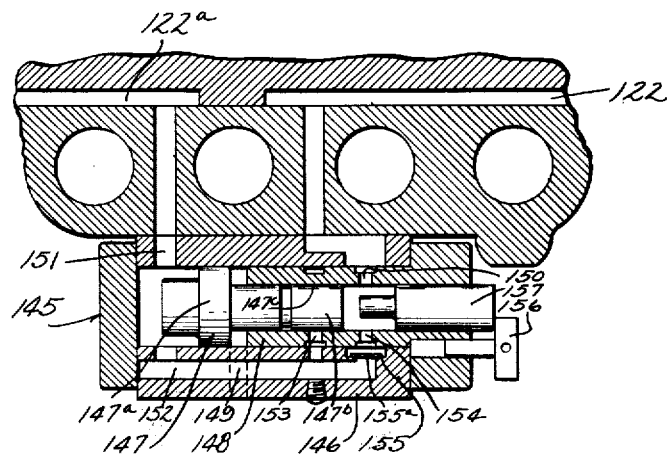
Figure 19 is a vertical section of a control device associated with the spindle reverser.

To further control the reverser engagement, an engagement control device is provided, generally denoted by the numeral 145, Figs. 15, 19. This device is connected serially in the line leading to the reverser piston device 47 from channel 121 of the delay device 103, as indicated in Fig. 15, and therefore controls the operation of the reverser under all conditions whether operated from lever 115 or from the rate selector since, as previously explained, all the fluid for shifting the reverser is derived from the port 121.

Device 145 includes a cylinder member 146, Figs. 8, 15, 19, carried by the removable housing 8 and fixed on the bottom of the housing member for the piston devices 63, 64, 65 and adjacent to the delay device 103. A piston 147, Fig. 19, provides an enlarged portion 147a and a relatively smaller portion 147b, the latter operating in a sleeve 148 fixed in the cylinder bore. The intermediate portion of the piston 147 is exposed to a drain port 149. The smaller area 147b is exposed to the pressure derived from the port 121 and channel 122, Fig. 11 of delay device 103, through a port 150. The larger area 147a is exposed through a port 151 and the channel 122a, Figs. 14, 19 to the pressure in the channel 123, Fig. 14 which supplies the reverser piston device 47 through the rotary control valve 119. A passage 152, Fig. 19, continuously communicates with the port 151 and channel 122a at the one end, and at the other end provides a port 153 which is alternatively covered or uncovered by the small piston end 147b as piston 147 moves to right or left respectively, but even when the piston 147 is to the right some communication exists between the channels 122 and 122a, the small piston end 147b being of slightly reduced diameter at 147c to provide a leakage path past the piston. A port 154 continuously communicates with channel 122 through port 150, and also with channel 122a through port 151, but is prevented from passing fluid from port 150 to port 151 by a one-way valve device 155, which may be of any suitable well known type, in this instance including a flat spring 155a which closes the channel in the direction mentioned but yields to permit substantially free flow of fluid from port 151 to 150.

By reason of the construction of device 145 as just described the reverser piston device 47 will operate to immediately disengage the reverser, as previously described, as a first step in the operation of rate change, the clutch engaging pressure being drained from the supply channel 122a through the one-way valve 155, Fig. 19, port 150, channel 122, and port 121 and drain port 114 of delay device 103, Fig. 11.

The piston 147 of control device 145 normally stands to the right in Fig. 19, being forced to this position by the relatively large area exposed at the left piston end. When the fluid is drained from channels 122, 122a, during rate change, the piston 147 temporarily remains to the right. But as fluid pressure is restored to channel 122, following a rate change, the piston 107 immediately moves to the left, because there is then no pressure on the larger left end. Such initial movement of the piston builds up an initial pressure in the port 151 and channel 122a, but the initial pressure is less than the pressure in channel 122 in the same proportion as the area of end 147b is less than the area of end 147a. The initial pressure for operation of reverser piston device 47 and the reverser 6 is therefore relatively low. The pressure in channel 122a is, however, gradually increased, by leakage through the restricted passage provided by the reduced piston diameter at 147c, until it becomes equal to the pressure in channel 122 and the reverser clutch plates are then exposed to the full operating pressure.

At some intermediate point in the increase of pressure just described, where the pressure on the larger end 147a of piston 147, Fig. 19, overbalances the pressure on the smaller end 147b, the piston 147 again moves to the right to take up its normal operating position. This right hand movement also operates to slow down the equalization of pressures in channels 122, 122a because the right hand movement increases the length of the restricted passageway at 147c and therefore reduces the rate of flow of the pressure equalizing fluid.

For regulation of the period required to build up the pressure in channel 122a, Fig. 19, there is provided a screw 156 which is adjustable to control the position of an abutment piston 157. The piston 157 is forced against screw 156 by fluid pressure, and provides an abutment determining the extent of the right hand movement of piston 147. The farther piston 147 stands to the right, Fig. 19, following movement to the right during the equalization of pressure between passages 122, 122a, the longer the equalizing operation will require.

By reason of the construction described the device 145 has no effect upon the disengagement of the reverser 6, but during engagement of either reverser clutch 13, 14 after interruption the device operates to start the transmission under initially reduced and gradually increasing pressure, thus starting the gears slowly under partial power to assist engagement thereof during a rate change operation and, in any engagement or reversal, operating to avoid shock by gradually overcoming the inertia of the driven train.

The sequence of operations involved in a rate change operation is as follows: Assuming that the lever 115, Fig. 16, is in a position to engage reverser 6, and that the desired new spindle speed is for the same direction of spindle rotation. In such case the only manual operation required is to rotate the selector in either direction by manipulation of the handles 83 of selector 71 until the desired new spindle speed, as listed on chart 73, is in registry with the indicator 72. During such rotation the poppet valve 105 of the delay device 103, Fig. 11, will be opened each time the cam 86 passes through a position intermediate the notches 86a, and as soon as the poppet valve is first opened the piston 107 starts to move to the right, Fig. 11, thereby connecting port 121 to drain 114 whereby to effect a shift of reverser piston device 47 and reverser 6 to intermediate motion interrupting position. Slightly later in the right hand movement of piston 107 of device 103 the port 111 is also opened to the drain 114, thereby immediately effecting a braking position of brake 42 to stop spindle 3. Upon the selector chart arriving at the desired speed position the poppet valve 105 of device 103 remains closed and fluid flows through needle valve 109, Fig. 11, to shift piston 107 to its normal left hand position. During such left hand shift it occurs first that port 111 is opened to pressure fluid, whereupon the spindle brake 42 is immediately released, and as the pressure rises in port 111 the rate change shifter piston devices 63, 64, 65 are subjected to pressure in the order mentioned, the sequence being controlled by the devices 142, 142a, 142b.

The new speed position of the selector device 71 effects a new position combination of the poppet valve cams and poppet valves associated with the piston devices 63, 64, 65, and therefore the rise of pressure in these devices will urge the pistons to effect a corresponding new position combination, but only those pistons will be moved where a poppet valve closed in the previous speed position has been opened in the new speed position.

Very shortly after pressure fluid has been admitted to the port 111, Fig. 11, the continued movement of piston 107 to the left also opens port 121 to pressure fluid, which is applied to the reverser piston device 47 through the control device 145 and the direction control valve 119 to effect engagement of the reverser 6. Since the direction control valve 119 has not been moved during the rate change operation the result is to engage reverser 6 to effect the same spindle direction as before the rate change, but by reason of the operation of the device 145 to initially restrict the fluid pressure to relatively low value, as previously explained, the reverser engagement is without jar or shock.

Following the release of brake 42 in the operation described above the spindle train is free to turn, the slight friction of the disengaged reverser clutch plates will ordinarily turn the train slowly to assist engagement of the various gears to be shifted during a rate change, but in any event the gears will start to turn as soon as the reverser starts to engage, and during the interval while device 145 is effecting the building up of the reverser pressure the gears will rotate slowly to insure meshing of the engaging gears.

It is to be noted that the construction and control of reverser-interruptor 6 is such that the device acts as an overload device limiting the power applied to the spindle and feed trains, and productive of various other useful results.

Certain features thereof are more particularly pointed out in a co-pending application, Serial No. 130,273, filed March 11, 1937, and all rights to the structure there claimed are specifically reserved, as well as to certain other features shown or described in this application, but claimed in one or the other of the several co-pending applications mentioned herein.

As previously pointed out, the removable housing member 8 carries substantially all the transmission and control mechanism for the spindle 3, the only exception being those parts directly associated with the spindle and therefore necessarily carried with the spindle in the integral upstanding frame portion 2, such as the spindle gear 41 and spindle brake 42, and those manually operable controller portions which, for operating convenience are carried at the front of the machine, such as the rate change controller portion 71a, and the reverser controller lever 115. And in each instance where an operative connection is required from portions carried by the removable housing 8 to portions carried on the bed portion 2, the connections are such as to be automatically disengageable and engageable as the housing 8 is removed and replaced.

Moreover the form and position of the removable housing 8 is such that the joint required for its removal has substantially no effect upon the rigidity or accuracy of the machine when under load. The position of the joint or junction between housing 8 and bed portion 2, namely, vertically disposed at the rear of the spindle and in a plane parallel with the spindle axis is such as to effect no weakening of the strain resisting structure intermediate the spindle and tool and further such as to facilitate the automatic engagement and disengagement of the couplings required between transmission or control portions respectively carried by the different structural portions.

What is claimed is:

1. In a lathe the combination of a bed providing a head stock portion uprising adjacent one end thereof, a work spindle journaled in said headstock portion, a unitary spindle rate change device removably fixed in predetermined position on said headstock portion adjacent said spindle and including an adjustable rate changer and a shaft driven therethrough together with shifter means operable for adjustment of said rate changer, and selector means for operation of said shifter means to effect a preferred rate change effect including a portion adjustably carried by said headstock portion and disengageable coupling elements respectively associated with said headstock portion and with said unitary device, said coupling elements being disengaged during removal of said unitary device and reengaged during replacement of said unitary device in said predeteremined position.

2. In a lathe the combination of a bed providing a headstock portion uprising adjacent one end thereof, a work spindle journaled in said headstock portion, a unitary spindle rate change device removably fixed in predetermined position on said headstock portion adjacent said spindle including an adjustable rate changer and a shaft driven through said rate changer together with shifter means for rate changer adjustment, selector means for operation of said shifter means to effect a preferred rate changer adjustment and including a portion adjustably carried on said headstock portion and a plurality of disengageable coupling elements respectively associated with said headstock portion and with said unitary device, and engaged gears, said engaged gears and said coupling elements each being disengaged during removal of said unitary device and reengaged upon replacement of said unitary device in said predetermined position.

3. In a lathe the combination of a bed providing a headstock portion uprising adjacent one end thereof, a work spindle journaled in said headstock portion, a unitary transmission and control device removably fixed on said headstock portion in predetermined position adjacent said spindle including an adjustable rate changer and a shaft driven therethrough together with power operable shifter means for rate changer adjustment, and selector means determinative of different power connection for said shifter means whereby to effect a preferred rate changer adjustment and including a portion adjustable on said headstock portion and disengageable coupling elements respectively associated with said headstock portion and with said unitary device, said coupling elements being disengaged during removal of unitary device and reengaged during replacement thereof in said predetermined position.

4. In a lathe the combination of a bed providing a headstock portion uprising adjacent one end thereof, a work spindle journaled in said headstock portion, a unitary transmission and control device removably fixed on said headstock portion in predetermined position adjacent said spindle including an adjustable rate changer and a shaft driven therethrough together with power operable shifter means for rate changer adjustment, selector means determinative of different power connection for said shafter means whereby to effect a preferred rate changer adjustment including a portion adjustable on said headstock portion and disengageable coupling elements respectively associated with said headstock portion and with said unitary device, and engaged gears for driving said spindle from said shaft, said gears and coupling elements each being disengaged during removal of said unitary device and reengaged during replacement of said unitary device in said predetermined position and said coupling elements being formed.

5. In a lathe the combination of a bed providing a headstock portion uprising adjacent one end thereof, a work spindle journaled in said headstock portion, a unitary transmission and control device removably fixed on said headstock portion in predetermined position adjacent said spindle including an adjustable rate changer and a shaft driven therethrough together with power operable shifter means for rate changer adjustment and adjustable power controller means determinative of the power connection to said shifter means, selector means for adjustment of said controller means including a portion adjustably carried on said headstock portion and disengageable coupling elements respectively associated with said headstock portion and with said removable unit, said coupling elements being disengaged during removal of said unitary device and reengaged during replacement of said unitary device in said predetermined position.

6. In a lathe the combination of a bed providing a headstock portion uprising adjacent one end thereof, a work spindle journaled in said headstock portion, a unitary transmission and control device removably fixed on said headstock portion in predetermined position adjacent said spindle including an adjustable rate changer and a shaft driven therethrough together with power operable shifter means for rate changer adjustment and adjustable power controller means determinative of the power connection to said shifter means, selector means for adjustment of said controller means including a portion adjustably carried on said headstock portion and disengageable coupling elements respectively associated with said headstock portion and with said removable unit, and engaged gears respectively on said driven shaft and on said spindle, said engaged gears and coupling elements each being disengageable during removal of said unitary device and reengageable during replacement of said device in said predetermined position.

7. In a lathe the combination of a bed providing a headstock uprising adjacent one end thereof, a horizontal work spindle journaled in said headstock, a spindle transmission carried by said headstock including an adjustable rate change device, a shaft driven therethrough and engaged gears repectively on said shaft and spindle, said headstock providing portions separably fixed together along a surface passing between said driven shaft and spindle whereby to provide a unitary device removably fixed with the spindle carrying headstock portion including the other headstock portion and said rate changer together with said driven shaft and the gear mounted thereon, said engaged gears being disengageable during removal of said unitary device and reengageable during replacement thereof.

8. A lathe as specified in claim 7 in which said headstock portions are fixed together along a substantially vertical plane adjacent the spindle axis.

9. In a lathe the combination of a bed, an upstanding headstock portion integrally joined therewith, a spindle journaled in said headstock portion, a unitary transmission device including a housing rearwardly removably fixed with said headstock portion in predetermined position relative thereto together with a shaft carried by said housing and adjustable rate change means connected to drive said shaft, meshed gears for driving said spindle from said shaft, said gears being disengageable during removal of said housing and reengageable upon replacement of said housing in said predetermined position, and brake means associated with said spindle and operative to brake said rate changer through said meshed disengageable gears.

10. In a lathe the combination of a bed, an upstanding headstock portion integrally joined therewith, a spindle journaled in said headstock portion, a unitary transmission device including a housing rearwardly removably fixed with said headstock portion in predetermined position relative thereto together with a plurality of shafts carried by said housing and adjustable rate change means connecting said shafts, rate changer controller means including a portion adjustably carried on said headstock portion and a portion adjustably carried by said housing together with disengageable coupling elements connecting said adjustable portions, and engaged gears respectively fixed on one of said shafts and on said spindle, said gears and coupling elements each being disengageable during removal of said housing and reengageable during replacement thereof in said predetermined position.

11. In a lathe the combination of a horizontally extended carriage guide portion, a headstock including a portion upstanding adjacent one end of said guide portion and rigidly permanently fixed therewith, a spindle horizontally journaled in said headstock portion, a spindle speed controller device including chart and indicator means relatively movably carried by said headstock portion and exposed for visibility to an operator stationed at the front side of the axis of said spindle, a spindle direction controller device including a movable lever exposed for operation by an operator in said position, together with a headstock housing portion removably rigidly joined with the first mentioned headstock portion in predetermined position at the other side of said spindle axis, spindle transmission mechanism unitarily removably carried by said housing portion including rate change mechanism and reversing mechanism, a motion transmitting connection from said speed controller device for operation of said rate change mechanism including disengageable and reengageable coupling members, and a motion transmitting connection from said reverser lever for operation of said reverser mechanism including disengageable and reengageable coupling elements, said disengageable members and disengageable elements being formed and positioned to facilitate the removal and replacement of said housing.

12. In a lathe the combination of a bed providing horizontally extended guideways, an upstanding headstock portion rigidly permanently fixed with said bed adjacent one end of said guideways, a horizontal spindle journaled in said headstock portion and axially parallel with said guideways, a spindle controller including a lever exposed for manipulation by an operator at the front side of said spindle axis, a unitary device including a frame removably fixed with said headstock portion at the other side of said spindle axis together with a spindle rate changer providing a terminal shaft and a terminal gear fixed on said shaft, a gear carried by said spindle and meshed with the terminal gear of said transmission, and disengageable coupling elements connecting said lever for operation of said rate changer, said gears being disengageable during removal of said unitary device and reengageable upon replacement thereof and said coupling elements being formed and positioned to facilitate said removal and replacement.

13. In a lathe the combination of a bed providing horizontally extended guideways, an upstanding headstock portion fixed with said bed adjacent one end of said guideways, a horizontal spindle journaled in said headstock portion and axially parallel with said guideways, a brake on said spindle, a unitary device removably fixed in predetermined position on said headstock portion including a spindle transmission shaft and power operable shifter means for said brake, and a train connecting said shifter means and brake including elements disengageable during removal of said unitary device and reengageab'e during replacement thereof in said predetermined position.

14. In a lathe the combination of a bed providing horizontally extended guideways, an upstanding headstock portion fixed with said bed adjacent one end of said guideways, a horizontal spindle journaled in said headstock portion and axially parallel with said guideways, a brake on said spindle, a unitary device removably fixed in predetermined position on said headstock portion including a spindle transmission shaft and power operable shifter means for said brake, meshed gears for driving said spindle from said shaft, and a train connecting said shifter means and brake including disengageable elements, said gears and elements each being disengageable during removal of said unitary device and reengageable during replacement thereof in said predetermined position.

15. In a lathe the combination of a bed, an upstanding headstock at one end thereof including a portion rigidly joined therewith, a horizontal spindle journaled in said headstock portion, a spindle transmission carried by said headstock including adjustable rate change means, a shaft driven through said rate change means and engaged gears respectively on said shaft and spindle, said headstock providing another portion separably fixed with the first mentioned portion along a surface passing between said driven shaft and spindle and carrying said rate change means together with said driven shaft and the gear mounted thereon, whereby to provide a unitary device removably fixed with said first mentioned headstock portion, said engaged gears being disengageable during removal of said unitary device and reengageable during replacement thereof.

WERNER IRVING SENGER.

---

CERTIFICATE OF CORRECTION.

Patent No. 2,151,808. March 28, 1939.

WERNER IRVING SENGER.

It is hereby certified that error appears in the printed specification of the above numbered patent requiring correction as follows: Page 3, second column, line 19, for "flage" read flange; page 5, second column, line 26, for "port 11" read port 111; line 32, for "is" read as; page 7, second column, line 75, claim 2, after "gears" and before the comma insert for driving said spindle from said shaft; page 8, first column, line 35, claim 4, for "shafter" read shifter; lines 45 and 46, same claim, strike out the words "and said coupling elements being formed"; and that the said Letters Patent should be read with this correction therein that the same may conform to the record of the case in the Patent Office.

Signed and sealed this 6th day of June, A. D. 1939.

(Seal)

Henry Van Arsdale
Acting Commissioner of Patents.

relatively movably carried by said headstock portion and exposed for visibility to an operator stationed at the front side of the axis of said spindle, a spindle direction controller device including a movable lever exposed for operation by an operator in said position, together with a headstock housing portion removably rigidly joined with the first mentioned headstock portion in predetermined position at the other side of said spindle axis, spindle transmission mechanism unitarily removably carried by said housing portion including rate change mechanism and reversing mechanism, a motion transmitting connection from said speed controller device for operation of said rate change mechanism including disengageable and reengageable coupling members, and a motion transmitting connection from said reverser lever for operation of said reverser mechanism including disengageable and reengageable coupling elements, said disengageable members and disengageable elements being formed and positioned to facilitate the removal and replacement of said housing.

12. In a lathe the combination of a bed providing horizontally extended guideways, an upstanding headstock portion rigidly permanently fixed with said bed adjacent one end of said guideways, a horizontal spindle journaled in said headstock portion and axially parallel with said guideways, a spindle controller including a lever exposed for manipulation by an operator at the front side of said spindle axis, a unitary device including a frame removably fixed with said headstock portion at the other side of said spindle axis together with a spindle rate changer providing a terminal shaft and a terminal gear fixed on said shaft, a gear carried by said spindle and meshed with the terminal gear of said transmission, and disengageable coupling elements connecting said lever for operation of said rate changer, said gears being disengageable during removal of said unitary device and reengageable upon replacement thereof and said coupling elements being formed and positioned to facilitate said removal and replacement.

13. In a lathe the combination of a bed providing horizontally extended guideways, an upstanding headstock portion fixed with said bed adjacent one end of said guideways, a horizontal spindle journaled in said headstock portion and axially parallel with said guideways, a brake on said spindle, a unitary device removably fixed in predetermined position on said headstock portion including a spindle transmission shaft and power operable shifter means for said brake, and a train connecting said shifter means and brake including elements disengageable during removal of said unitary device and reengageab'e during replacement thereof in said predetermined position.

14. In a lathe the combination of a bed providing horizontally extended guideways, an upstanding headstock portion fixed with said bed adjacent one end of said guideways, a horizontal spindle journaled in said headstock portion and axially parallel with said guideways, a brake on said spindle, a unitary device removably fixed in predetermined position on said headstock portion including a spindle transmission shaft and power operable shifter means for said brake, meshed gears for driving said spindle from said shaft, and a train connecting said shifter means and brake including disengageable elements, said gears and elements each being disengageable during removal of said unitary device and reengageable during replacement thereof in said predetermined position.

15. In a lathe the combination of a bed, an upstanding headstock at one end thereof including a portion rigidly joined therewith, a horizontal spindle journaled in said headstock portion, a spindle transmission carried by said headstock including adjustable rate change means, a shaft driven through said rate change means and engaged gears respectively on said shaft and spindle, said headstock providing another portion separably fixed with the first mentioned portion along a surface passing between said driven shaft and spindle and carrying said rate change means together with said driven shaft and the gear mounted thereon, whereby to provide a unitary device removably fixed ᵂith said first mentioned headstock portion, said engaged gears being disengageable during removal of said unitary device and reengageable during replacement thereof.

WERNER IRVING SENGER.

---

CERTIFICATE OF CORRECTION.

Patent No. 2,151,808.      March 28, 1939.

WERNER IRVING SENGER.

It is hereby certified that error appears in the printed specification of the above numbered patent requiring correction as follows: Page 3, second column, line 19, for "flage" read flange; page 5, second column, line 26, for "port 11" read port 111; line 32, for "is" read as; page 7, second column, line 75, claim 2, after "gears" and before the comma insert for driving said spindle from said shaft; page 8, first column, line 35, claim 4, for "shafter" read shifter; lines 45 and 46, same claim, strike out the words "and said coupling elements being formed"; and that the said Letters Patent should be read with this correction therein that the same may conform to the record of the case in the Patent Office.

Signed and sealed this 6th day of June, A. D. 1939.

Henry Van Arsdale

Acting Commissioner of Patents.

(Seal)